Sept. 27, 1938. R. P. HILL 2,131,105
DRAFT TUBE THROAT RING
Filed Oct. 21, 1936 2 Sheets-Sheet 1

INVENTOR
RAYMOND P. HILL
Harold L. Cook
ATTORNEY

Sept. 27, 1938.   R. P. HILL   2,131,105
DRAFT TUBE THROAT RING
Filed Oct. 21, 1936   2 Sheets-Sheet 2

INVENTOR
RAYMOND P. HILL
Harold L. Cook
ATTORNEY

Patented Sept. 27, 1938

2,131,105

UNITED STATES PATENT OFFICE 2,131,105

DRAFT TUBE THROAT RING

Raymond P. Hill, Orange, N. J.

Application October 21, 1936, Serial No. 106,793

3 Claims. (Cl. 259—1)

This invention relates to pulp bleaching tanks such as used in the paper pulp industries for bleaching pulp, and has particular reference to an improved throat ring for the draft tube of a pulp bleaching tank.

It is a primary object of the invention to provide a throat ring for bleaching tubes and the like which may be fabricated in sections at the mill, which sections may then be transported to any desired destination without change in shape or dimensions due to warping or shrinkage.

It is a further object of the invention to provide a wooden throat ring for pulp bleaching tubes and the like which will not discolor the pulp during bleaching operations.

It is a further object of the invention to provide a throat ring of the character described which may be fabricated of lumber which has been kiln dried to approximately 6% moisture content.

Other objects and advantages of my invention will become apparent from a careful study of the following description, wherein the significance of the reference characters in the accompanying drawings, details of construction and manner of operation of a throat ring embodying my invention, as well as the particular advantages thereof, are fully explained.

Preliminary to a more detailed description of a throat ring embodying the present invention, it may be stated that the structure is circular in shape and serves to guide the downwardly flowing pulp in a draft tube into the scope of an impeller, which both agitates the pulp and forces it out of the tube and upwardly between the walls of the tube and the walls of the bleaching tank.

Figure 1:
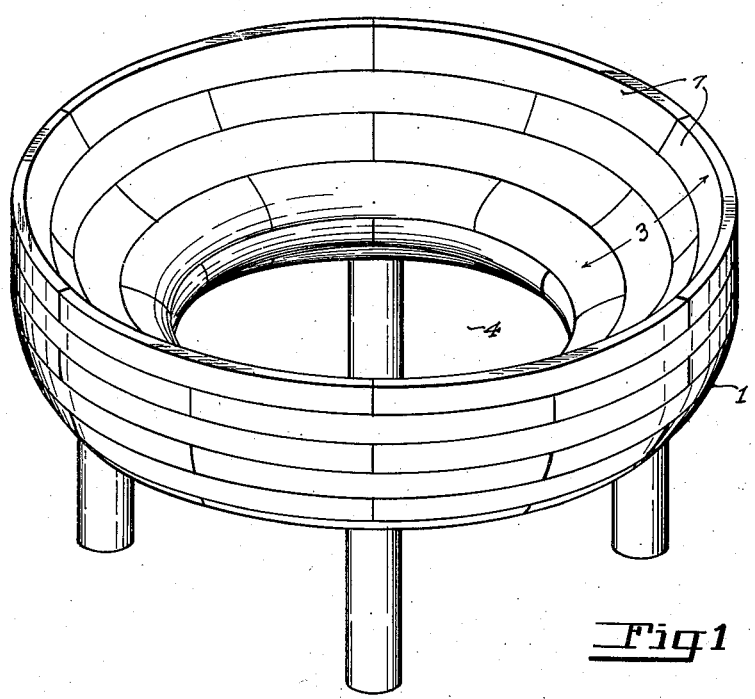
Figure 1 is a perspective view of a throat ring embodying the present invention.
Figure 2:
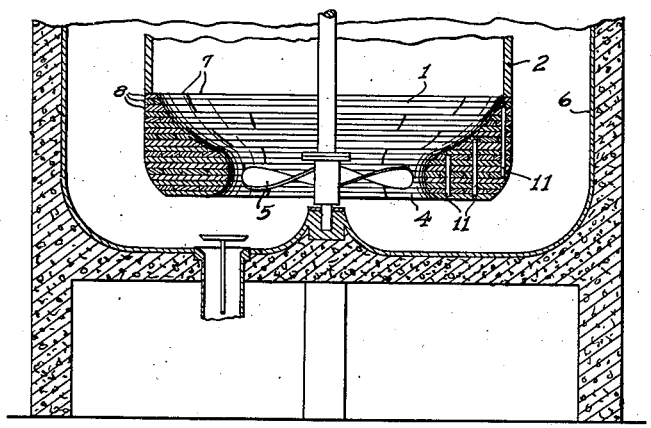
Figure 2 is a sectional elevation of the bottom portion of a pulp bleaching tank and illustrates the lower end of the draft tube for circulating the pulp, and particularly the operative position of the throat ring.
Figure 3:
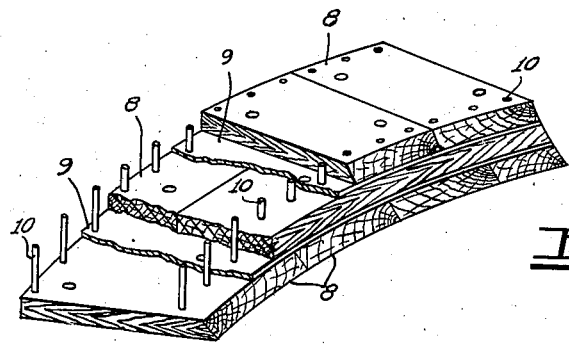
Figure 3 is a perspective view of one of the fabricated segments of the throat ring, certain portions thereof being broken away.
Figure 4:
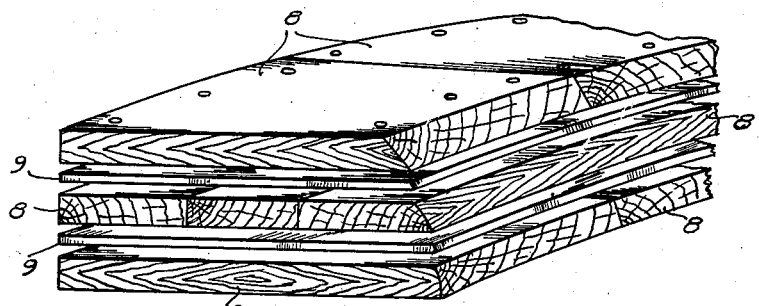
Figure 4 is a fragmentary elevation of one of the segments of the throat ring illustrating the manner of assembling the respective parts thereof.
Figure 5:
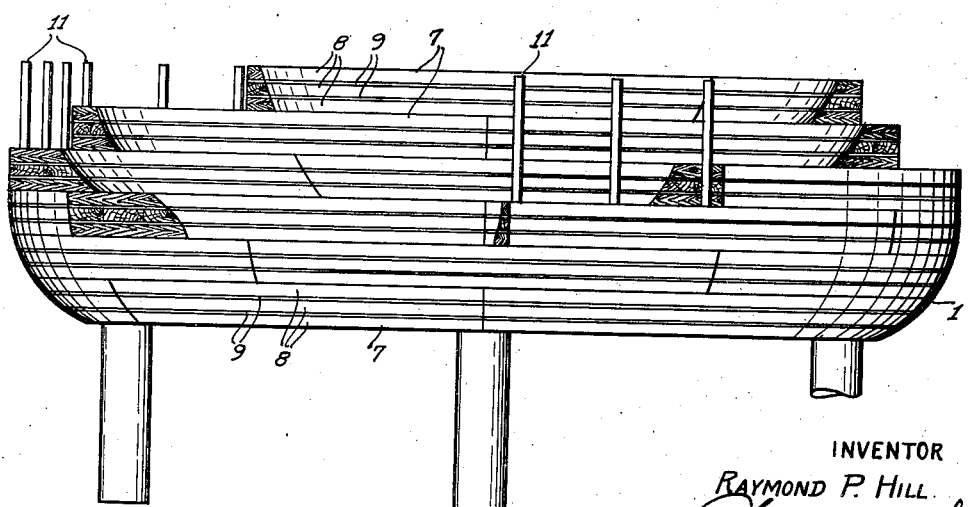
Figure 5 is a side elevation of a throat ring, a part of the segments thereof being removed to illustrate the manner in which the segments are placed together to complete the structure.

As best seen in Figure 2, the throat ring 1 forms a continuation of the draft tube 2, a central orifice 4 being provided in its base. An impeller 5 is positioned within the orifice 4 and serves to agitate the downwardly moving pulp and to force it upwardly in the passage between the tube 2 and the inside wall of the tank 6.

The throat ring is built up of circular segments generally indicated at 7, each segment being composed of relatively thin pieces of lumber, which may be kiln dried to approximately 6% moisture content. These pieces of lumber are accurately milled and fitted together to form slab segments 8, the pieces comprising a slab being held together by thin sheets of material such as plywood 9 which are glued to the slabs. The slabs 8 are placed one upon another, having a sheet of plywood 9 between each two adjacent slabs 8 to which the slabs are glued, and are further secured by dowels 10 to maintain them permanently in their proper relative positions. In the illustrated embodiment of the invention each segment is composed of three slabs 8 and two sheets of plywood 9, as shown. The top and bottom slab of each segment is formed of pieces of lumber the grain of which is parallel to the radii of the throat ring, while the middle slab is formed of pieces of wood the grain of which runs at a right angle to the grain of the wood in the top and bottom slabs.

Each segment 7 is so shaped as to form a part of a circle or ring, the curvature of the segment being in direct proportion to its length and the diameter of the ring. In the construction of a throat ring the segments 7 are placed in circular arrangement and in superposed relation to form a bowl-like structure having a central orifice 4 therethrough for the passage of pulp. The inner wall of said throat ring comprises a concave surface 3 generated by rotation of a parabolic curve about its axis, the orifice 4 through the base of the ring being generated by rotation of an arc about the axis of the ring, the chord of the arc being parallel to said axis.

In the construction of the throat ring the segments 7 are mounted in overlapping relation, and are held together by master dowels 11 which fit into corresponding holes in the adjacent segments to keep them permanently in their proper relative positions. The master dowels which engage the wider segments which form the base of the throat ring are contained entirely within adjacent segments and do not project therethrough into the interior of the throat ring through the parabolic surface 3. Likewise, the dowels 11 which engage the narrow segments at the top of the ring do not project through the outer surface of the wall where it curves under toward the base.

Having now described my invention and in what manner the same may be used, what I claim as new and desire to protect by Letters Patent is:

1. A throat ring for draft tubes and the like comprising a plurality of fabricated segments placed in circular arrangement and mounted in superposed relation, each segment being built up of relatively thin pieces of lumber fitted together to form slabs, a plurality of said slabs being laid one upon another, a sheet of plywood between adjacent said slabs, said slabs and plywood being permanently secured in unitary relation.

2. A throat ring for draft tubes and the like, consisting of fabricated wooden segments placed in circular arrangement and mounted in superposed overlapping relation, each segment comprising relatively thin pieces of lumber secured in edge to edge relation to form slabs, said slabs being placed one upon another and having a sheet of plywood interposed therebetween as a bonding member to maintain said pieces of lumber integrally as slabs, said slabs and plywood being doweled and glued to integrally form one segment of said ring, the inner wall of said throat ring comprising a concave surface, a central orifice through said ring for the passage of liquids, dowels engaging adjacent segments, said dowels passing through a plurality of said segments without interrupting the surfaces of said ring.

3. A structure having walls consisting of fabricated wooden segments placed in circular arrangement and mounted in superposed overlapping relation, each segment comprising relatively thin pieces of lumber secured in edge to edge relation to form slabs, said slabs being placed one upon another and having a bonding member interposed therebetween and secured thereto to maintain said pieces of lumber integrally as slabs, said slabs and bonding member being doweled and glued to integrally form one segment, and dowels engaging adjacent segments.

RAYMOND P. HILL.